(12) United States Patent
Remy et al.

(10) Patent No.: US 7,376,221 B1
(45) Date of Patent: May 20, 2008

(54) METHODS AND APPARATUS FOR MULTI-MODE TELEPHONE

(75) Inventors: Terrence E. Remy, Bowie, MD (US); David L. Glazner, Flower Mound, TX (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 10/922,704

(22) Filed: Aug. 20, 2004

(51) Int. Cl.
H04M 11/00 (2006.01)
(52) U.S. Cl. .................... 379/93.07; 455/552.1
(58) Field of Classification Search ............. 379/93.07, 379/93.09, 90.01; 455/573, 572, 552.1, 553.1
See application file for complete search history.

(56) References Cited

U.S. PATENT DOCUMENTS

| | | | | |
|---|---|---|---|---|
| 5,408,520 A | * | 4/1995 | Clark et al. ............... | 379/93.07 |
| 5,517,547 A | * | 5/1996 | Ladha et al. .................. | 379/40 |
| 5,526,403 A | * | 6/1996 | Tam ......................... | 455/553.1 |
| 6,131,136 A | * | 10/2000 | Liebenow et al. ........ | 455/553.1 |
| 6,256,518 B1 | * | 7/2001 | Buhrmann ................... | 455/572 |
| 2004/0072544 A1 | * | 4/2004 | Alexis ...................... | 455/554.1 |
| 2004/0192410 A1 | * | 9/2004 | Kralik et al. ............... | 455/573 |
| 2005/0143149 A1 | * | 6/2005 | Becker et al. ........... | 455/575.1 |

* cited by examiner

Primary Examiner—Stella Woo

(57) ABSTRACT

A multi-mode telephone, e.g., an enhanced cell phone, includes a battery powered telephone module and a POTS telephone module. The phone includes a telephone jack for coupling the phone to a landline. When connected through the landline, the phone includes a mode of operation in which the phone can be operated without any external AC power source and without using internal battery power, the power used being supplied via the POTS landline. The multi-mode phone may function as a lifeline in times of emergency, e.g., during power failures when cell phone calls cannot be completed. Other modes of operation include an enhanced landline mode using the phone's battery power to provide enhanced features such as, e.g., caller ID. If battery power is depleted in the enhanced landline mode, the phone reverts to a standard POTS phone, e.g., during an in progress call, requiring no battery power for continued operation.

16 Claims, 3 Drawing Sheets

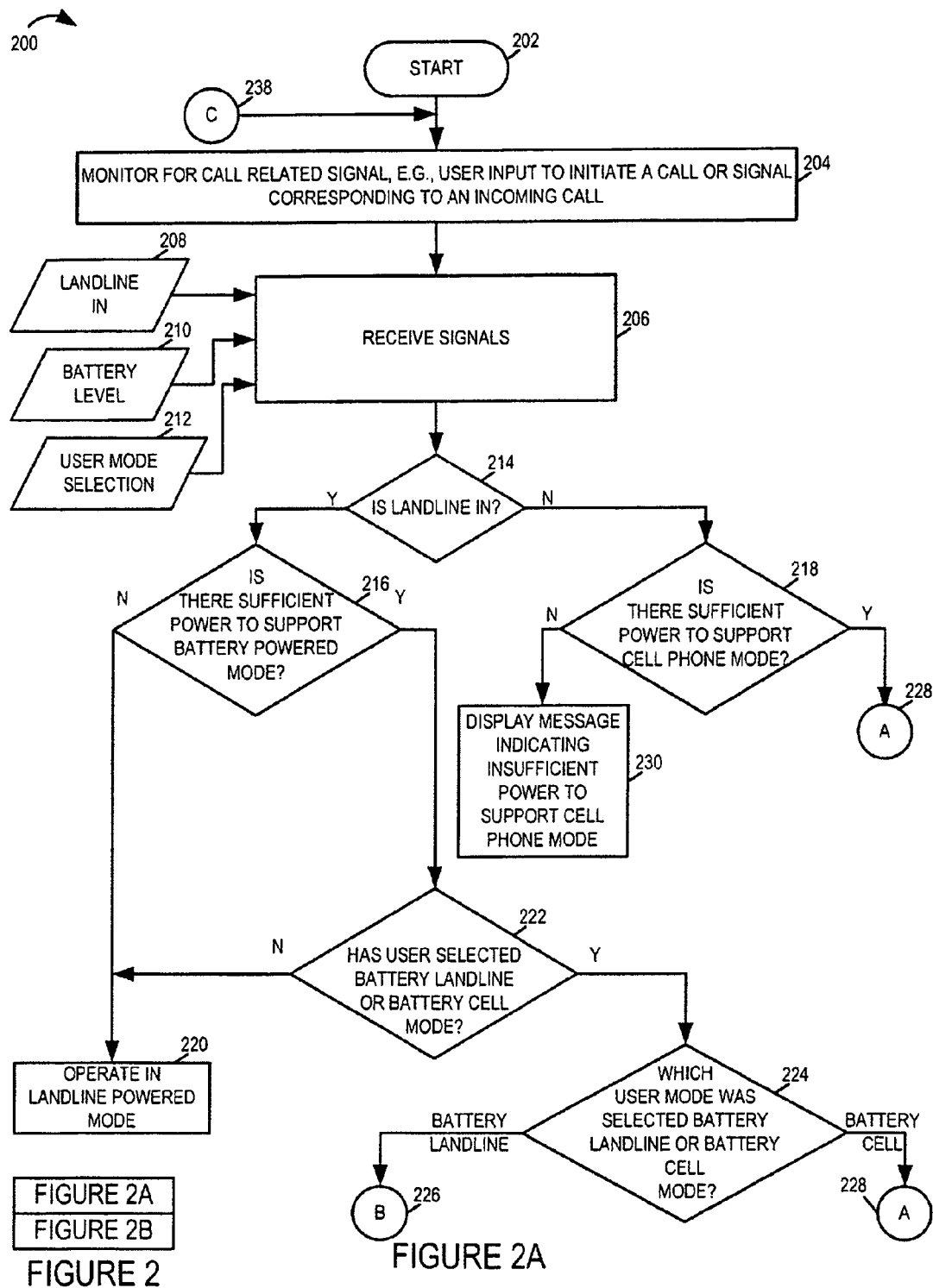

METHODS AND APPARATUS FOR MULTI-MODE TELEPHONE

FIELD OF THE INVENTION

The present invention relates to the field of telephone communications, and more particularly to the field of multi-mode battery powered telephones including both landline and wireless functionality.

BACKGROUND

Many telephones currently used in both the home and/or the office require AC power to operate. Such AC powered phones cannot derive dial tone if AC power is not present. Examples of such phones include cordless phones with an AC powered local base station, advanced feature phones including displays and accommodating such options as caller identification (ID), phones integrated with other devices, such as e.g., automated answering and/or automated call machines, and Internet Protocol (IP) phones. As consumers and industry have embraced these new AC powered phones, in many cases, these new AC powered phones have replaced older equipment, e.g., standard plain old telephone service (POTS) phones which are powered via a landline telephone line coupled to a Central Office and did not require an AC power source to operate. In many cases, a home or an office no longer has any standard POTS phones and now uses solely AC powered phones.

In the event of a power failure, e.g., due to a downed power line or transformer from a storm, due to a power station shutdown, or due to a terrorist act, homes or businesses using AC powered phones would be unable to make any calls out of or receive any calls into the residence or business, even though, in many cases, the landline phone lines to the residence or business would be still intact and fully operational.

Although many individuals now carry a personal cell phone, the cellular networks have limited capacity. In times of emergency, the number of individuals attempting to use their cell phones simultaneously may, and in many cases does, exceed the capacity, resulting in many individuals being unable to complete a call. In addition, cell phones coverage varies as a function of location. Cell phone coverage in offices and buildings is limited due to the problems associated with signal propagation. Individuals, e.g., trapped in a building, may be in a location of poor reception such as the interior of a building and be unable to complete a cell phone call. Also, in many instances, the cell tower and/or cell base station may have also lost power, rendering the cell phones within that cell useless.

Cell phones operate on batteries with limited energy storage capacity and require frequent recharges using AC power or battery replacement. In times of an extended local AC power outage, many cell phones may become inoperative due to depleted batteries.

In view of the above mentioned problems, it would be advantageous if cordless phones, e.g., cell phones, included a capability to function as a conventional POTS phone, requiring no AC power. It would be advantages if such multi-mode phones included battery monitoring capabilities and provided users with different options, e.g., options requiring no battery power and options using battery power and perhaps providing additional advanced capabilities.

SUMMARY OF THE INVENTION

The invention is directed to methods and apparatus for providing a multi-mode telephone, e.g., an enhanced cell phone or enhanced local wireless phone, including a battery powered telephone module and a landline, e.g., POTS, telephone module. A multi-mode phone, in accordance with the invention, includes a telephone jack for coupling the phone to a landline. When connected through the landline, the phone includes a mode of operation in which the phone can be operated without any external AC power source and without using internal battery power, the power used by the phone for call initiation and communication being supplied via the POTS landline. In some embodiments, when a landline is detected, e.g., mechanically and/or electrically, as being connected to the telephone jack, the phone automatically defaults into a landline mode, e.g., POTS mode. The multi-mode phone may function as a lifeline in times of emergency, e.g., during AC power failures when cell phone calls cannot be completed. In such a case, if an operational POTS landline is available, the phone provides the user with an operational telephone device, requiring no AC or battery power source, by plugging into the standard POTS landline. Phone features such as limited memory dialing which can be supported from the power available from the telephone line may be provided in the landline powered mode of operation.

Other modes of operation include various battery powered modes of operation. In these battery powered modes, in addition to functions which can be powered from the telephone line more power intensive functions, e.g., function involving the use of a digital display, are supported. A user selectable enhanced landline mode using the phone's battery power to provide enhanced features such as, e.g., caller ID, are supported in some embodiments. If battery power is depleted while operating in the enhanced landline mode, the phone reverts to a default landline powered mode, e.g., a standard POTS phone mode. This transition may occur while a call is ongoing. The default landline mode requires no battery power for continued operation, and allows the call in progress to complete normally.

In addition to the battery powered land line mode, a battery powered cell phone mode is supported in many embodiments.

Some embodiments of the invention allow a user to select the mode of operation, e.g., a POTS mode, a battery powered landline mode, and/or a cell phone battery powered mode, assuming sufficient power is available to support the various modes of operation. The condition of the battery is monitored, e.g., periodically during operation, and the entrance into and/or continuation in a battery powered mode is dependent upon the battery level meeting or exceeding an acceptable threshold. Some embodiments use different thresholds for each of the different battery powered modes, e.g., a landline battery powered threshold and a cell phone battery powered threshold, as different interfaces and equipment are required in each mode.

A mode selection module uses input from the telephone jack status, battery condition monitor, and/or user selection input to determine the mode of operation. In some embodiments, the mode selection module is coupled to the landline, e.g., POTS module, the battery powered telephone module (cell phone/advanced landline module), and mode control switching circuitry; the mode control module activating and deactivating various modules and controlling the coupling of various I/O devices, e.g., keypads and speakers to the landline, e.g., POTS, and/or battery powered telephone module.

DETAILED DESCRIPTION

Figure 1:
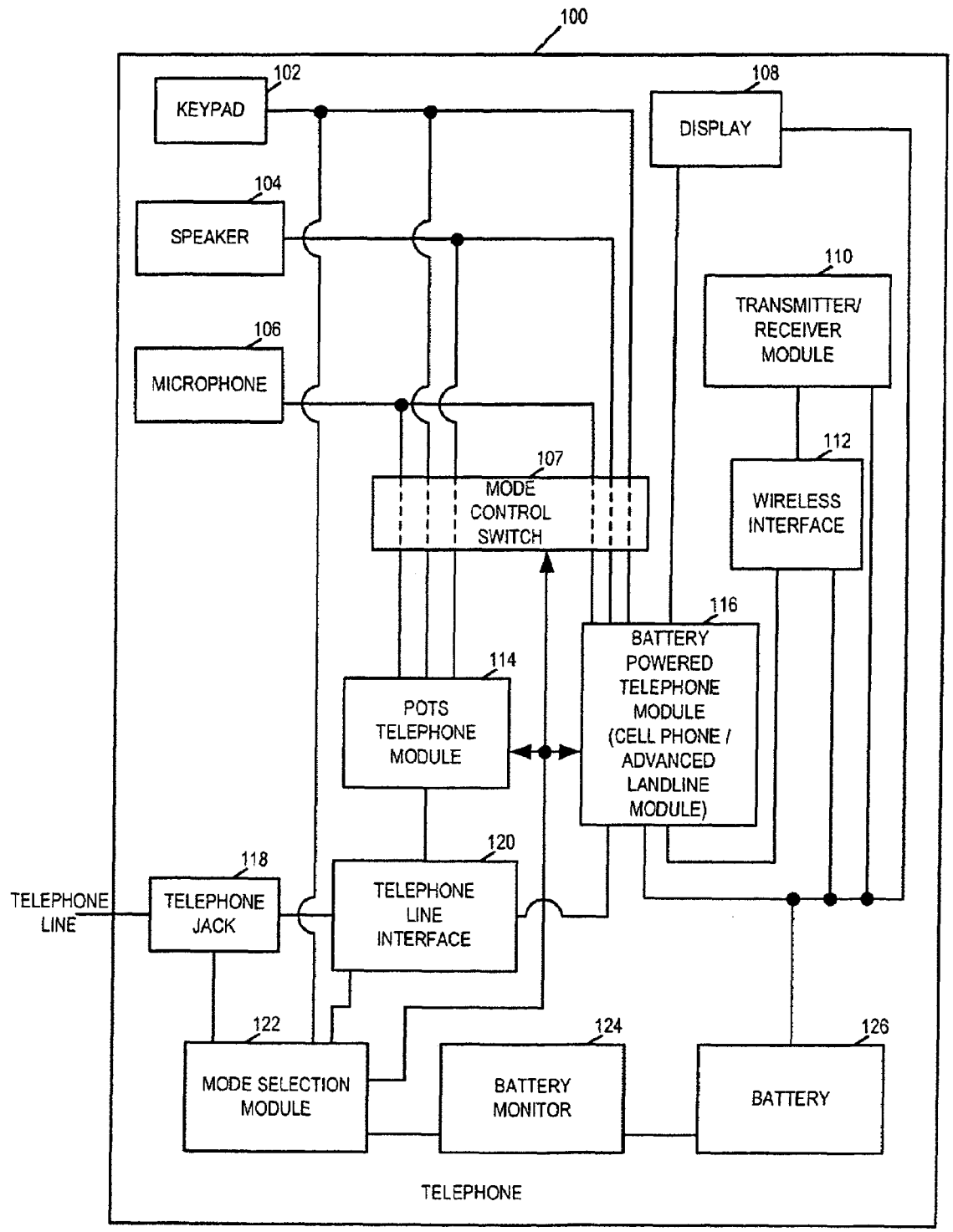
FIG. 1 is a drawing of an exemplary multi-mode telephone implemented in accordance with the present invention.

FIG. 1 illustrates an exemplary multi-mode phone 100 implemented in accordance with the present invention.

The telephone 100 includes circuitry capable of supporting basic landline telephone service sometimes called (POTS) using the power available from a telephone line. It also includes circuitry which allows the telephone 100 to operate as a cell phone and/or to provide advanced telephone service features such as caller ID capability which may require a power source, e.g., a battery 126, in addition to any power which may be obtained from a telephone line. In accordance with the invention, depending on the amount of power available, e.g., remaining battery power, a user can switch between one or more of the different modes of operation, e.g., by entering telephone mode selection choices on the telephone keypad. As battery power diminishes, the options available to the telephone user also diminish. When the battery is dead, as long as the telephone is plugged into a standard telephone line, the user is presented with the minimum level of telephone service which can be supported based on the power supplied by the telephone line. Such minimum service includes, as in a conventional telephone which does not include an independent power source, the ability to receive and place calls, e.g., using conventional POTS telephone circuitry which does not require a battery or other power source in addition to the power supplied via the telephone line.

The exemplary multi-mode telephone 100 of the present invention includes a keypad 102, speaker 104, microphone 106, telephone jack 118, e.g., an RJ11 type jack, POTS telephone module 114, telephone line interface 120, a mode control switch 107, a display 108, a battery powered telephone module 116, a transmitter/receiver module 110, a wireless interface 112, a battery 126, a battery monitor 124 and a mode selection module 122.

Keypad 102, speaker 104 and microphone 106 are conventional telephone elements which may be used regardless of the telephone mode (battery or line powered) of operation. Accordingly, each of these elements 102, 104, 106 are coupled to both the POTS telephone module 114 and the battery powered telephone module 116. In the embodiment illustrated in FIG. 1, the mode control select switch 107 is used to couple the keypad 102, speaker 104 and microphone 106 to each of the POTS telephone module 114 and battery powered telephone module 116. During a fully landline powered mode of operation, the mode control switch 107 disconnects the speaker 104, microphone 106 and keypad 102 from the battery powered telephone module 116 to reduce power consumption. In the fully landline powered mode of operation, dial tone and other signal generation operations are performed based on the power supplied via the telephone line to POTS telephone module 114.

The POTS telephone module 114 is coupled via telephone line interface 120 to the telephone jack 118. Similarly the battery powered telephone module 116 is coupled via telephone line interface 120 to telephone jack 118. The POTS telephone module 114 includes telephone circuitry which is capable of being powered directly from the power provided via a telephone line inserted into jack 118 independent of a battery thereby eliminating the need for battery power in the fully landline powered embodiments. POTS telephone module 114 may be implemented using conventional POTS land line telephone circuitry. Battery powered telephone module 116 includes cell phone and/or advanced landline circuitry, e.g., circuitry used to support cell phone communications and/or advance telephone features such as caller ID. Other advanced telephone features may include speed dial functionality, call waiting, call forwarding, message retrieval, caller ID look up table display, status message display, playing of stored audio, e.g., musical tones, in response to a received call, and activation of a vibration device in response to a received call. The battery powered telephone module 116 is coupled to display 108 which is used for displaying, e.g., cell phone call information, caller ID information, etc. The battery powered telephone module 116 is coupled to wireless interface 112. Through the wireless interface 112, the battery powered telephone module 116 can receive and transmit signals via transmitter/receiver module 110 which allows the phone to transmit and receive radio signals. In addition, the module 116 can receive signals from a telephone line via the telephone line interface 120 which coupled the battery powered telephone module 116 to telephone jack 118. Thus, the battery powered telephone module 116 can support caller ID and other services when the telephone is coupled to a telephone line. The battery powered telephone module 116 supports most cell phone functions and is coupled to the keypad 102, speaker 104 and microphone 106 and interacts with these elements when the phone 100 is operating as a cell phone. When operating in a landline mode of operation, the battery powered telephone module 116 may still interact with the keypad 102 to facilitate selection of stored telephone numbers for dialing, etc.

The battery 126 supplies power to the battery powered telephone module 116, wireless interface 112, transmitter/receiver module 110, display 108 and battery monitor 124. Thus, functions performed by these elements of the telephone 100 are dependent on battery power being available. Battery monitor 124 monitors the amount of power available from the battery 126. This information regarding the battery condition is supplied to mode selection module 122.

Mode selection module 122 is coupled to the telephone jack 118, keypad 102, telephone line interface 120 and battery monitor 124. In addition, it has a mode control signal output coupled to the POTS telephone module 114 and the battery powered telephone module 116 and mode control switch 107. Accordingly, mode selection module 122 can signal to the POTS telephone module 114 and battery powered telephone module 116 the particular mode of telephone operation selected at a point in time and control the disconnection of the battery powered telephone module 116 from the speaker, 104 microphone 106 and keypad 102 when the fully landline powered mode of operation has been selected.

The mode selection module 122 is responsible for selecting and controlling the mode of operation based on various conditions. The mode selection module 122 is informed of whether an active telephone line is inserted into telephone jack 118 by a signal received from the telephone jack 118 and/or telephone line interface 120. A simple mechanical switch may provide the signal from telephone jack 118 while the telephone line interface may provide a line present indicator signal based on power being received from the telephone jack 118, e.g., power received from an inserted telephone line. Obviously, land line modes of operation can only be supported when a telephone line is inserted into telephone jack 118. When such a landline is not present, assuming sufficient battery power, the mode selection module 122 will default to a cell phone mode of operation.

Depending on the amount of battery power available, e.g., as indicated by the battery monitor 124, assuming a telephone line is attached, the mode selection module 122 will control the phone 100 to operate in one of 3 modes 1) cell phone mode; 2) advanced landline mode; and 3) POTS line powered mode. Assuming sufficient battery power is available and a landline is attached to the phone 100, as indicated by a signal received from the telephone jack 118 and/or telephone line interface 120, the mode selection module 122 will select one of the 3 modes of operation based on input received from keypad 102, e.g., input indicating a user selection.

In the absence of receiving a signal indicating a user selection of a mode of operation, in order to conserve power, in the case where an active telephone line is present in jack 118, the POTS line powered mode of operation will be selected as the default mode of operation.

The mode selection module 122 will automatically switch between a battery powered landline mode of operation and the more basic line powered mode of operation when insufficient battery power remains to continue to support the advanced telephone modes of operation. This transition may occur at any time, e.g., even during a landline telephone call, without affecting the call and/or the ability to receive telephone calls if the transition occurs when a call is not on-going.

Significantly, unlike conventional cell phones, the phone 100 of the present invention includes means for supporting telephone calls through the use of a landline connection with the need for a power source other than the power provided by a conventional telephone line. Thus, in the event that the phone's battery 126 runs out of power landline telephone operation can still be supported. In addition, in the case of cell phone congestion, which tends to occur in the case of a regional emergency due to a large number of people trying to make cell phone calls at the same time, the user of the phone 100 can connect to a landline and make a call over the land line instead of using the cell phone capability. Another situation where the phone of the present invention can be useful is in the case of power outages. In many cases people now use cordless phones in their home which depend on household power to operate. In the case of an emergency, such a power dependent phone could be unplugged from the landline and the landline inserted into the telephone 100 allowing the user of the phone 100 to make and receive calls without a separate power source whether or not the battery 126 is charged.

Numerous variations on the novel telephone of the present invention are possible while staying within the scope of the present invention. For example, a simplified version of the phone which supports telephone powered calls and cell phone calls but not advanced landline calling functions such as caller ID could be implemented. In addition, a variety of level of circuit integration may be implemented. For example, the POTS telephone module 114 and battery powered telephone module 116 can be implemented on a single chip.

Figure 2B:
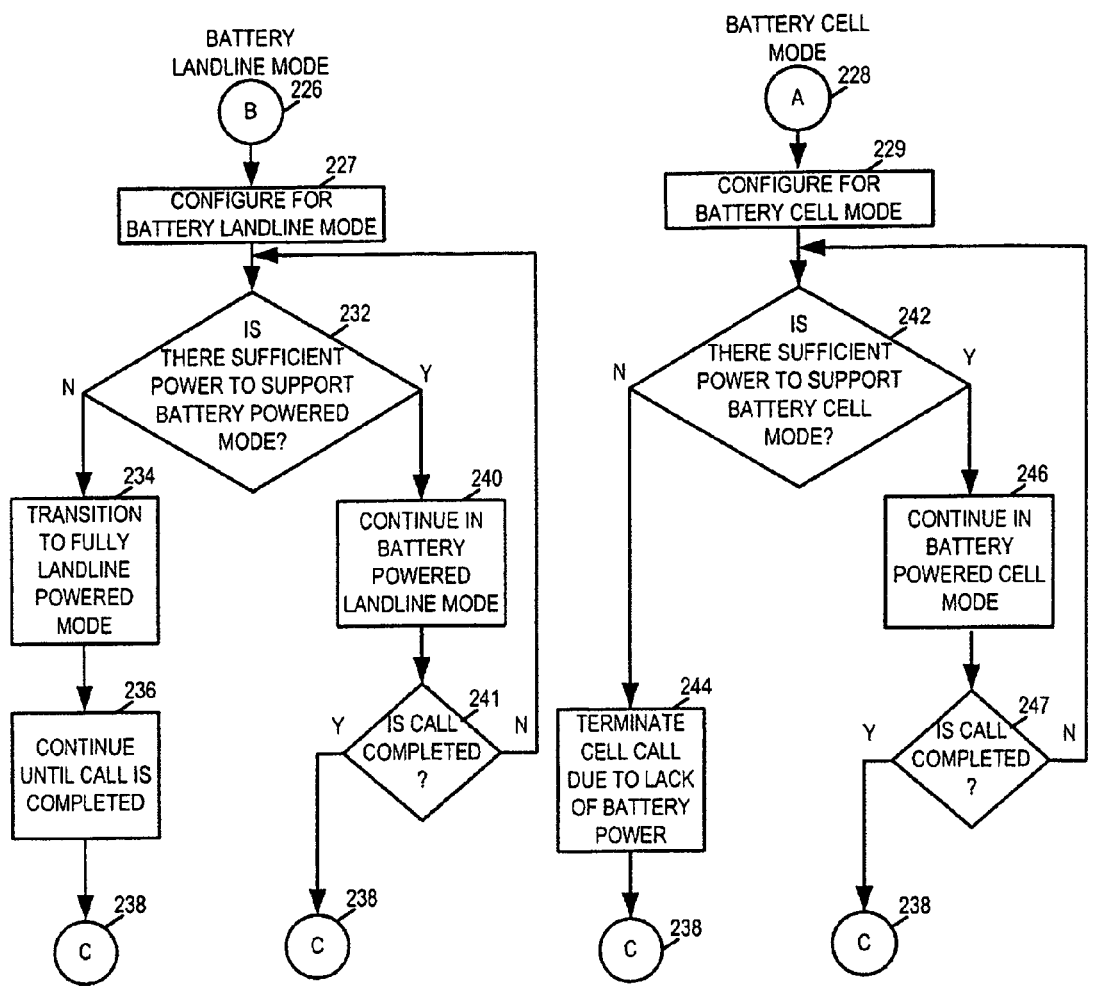
FIG. 2, which comprises the combination of FIG. 2A and FIG. 2B, is a flowchart of an exemplary method of operating a multi-mode telephone in accordance with the present invention.

FIG. 2 is a flowchart 200 illustrating an exemplary method of operating a multi-mode telephone in accordance with the present invention. Operation starts in step 202 and proceeds to step 204, in which the telephone is operated to monitor for call related signal, e.g., user input to initiate a call or a signal corresponding to an incoming call. For example, a user may enter input via keypad 102 to initiate a call, or an incoming call signal may be received via the landline telephone line or via the transmitter/receiver module 110. Operation proceeds from step 204 to step 206.

In step 206, the telephone is operated to receive signals which include any signals detected in step 204, a landline in signal 208, a battery level signal 210, and/or a user mode selection signal 212. Signals received over the landline telephone line are routed through the telephone jack 118 to the telephone line interface 120 and directed to the POTS telephone module 114 and/or the battery powered telephone module 116. Signals received via a wireless communications link are received via the antenna and receiver of the transmitter/receiver module 110 and forwarded via the wireless interface 112 to the battery powered telephone module 116. A landline in signal 208, signifying that the telephone 100 is currently plugged into a landline, may also be received and processed by the telephone 100. For example, the telephone jack 118 may include a switch and/or circuit which senses when a telephone line is plugged into the jack 118. In some embodiments, the circuit also checks that the landline is operational, e.g., appropriate expected signal levels are present. The output signal of the switch and/or circuit is an input to the mode selection module 122. Battery monitor 124 monitors the status of battery 126 and outputs a signal to the mode selection circuit indicative of the battery level. In some embodiments, different levels of acceptable battery levels exist for different battery powered modes of operation, e.g., a first minimum acceptable level for landline battery powered operations and a second minimum acceptable level for wireless, e.g., cell phone, battery powered operations. User mode selection signals, generated from user mode selection input through the keypad 102, are directed to the mode selection module 122. For example, the user may select to operate the telephone 100 as a battery powered landline phone using caller ID, or the user may select to use the phone as a battery powered cell phone. Operation proceeds from step 206 to step 214.

In step 214, the telephone is operated to check if a landline is installed. For example, mode selection module 122 checks for a signal from the telephone jack 118 and/or the telephone line interface 120 providing status on the presence of a telephone line. If it is detected that a landline is connected to the phone, then operation proceeds to step 216; otherwise operation proceeds to step 218.

In step 216, the telephone 100 is operated to check if there is sufficient power to support a battery powered mode of operation. For example, mode selection module 122 may receive and evaluate a battery status indication signal from the battery monitor 124. If it is detected in step 216 that there is insufficient power to support a battery powered mode, then operation proceeds to step 220, where the telephone 100 is operated in landline powered mode, e.g., a POTS mode of operation in which the POTS line supplies any power needed by the phone and the battery 126 is not used. For example, in such a case, mode selection module 122 controls: the POTS telephone module 114 to be active, the battery powered telephone module 116 to be inactive, mode control switch 107 to couple the keypad 102, the speaker 104, and the microphone 106 to the POTS telephone module 114, and mode control switch 107 to decouple the keypad 102, speaker 104, and microphone 106 from the battery powered telephone module 116.

However, if there is sufficient power to support a battery powered mode, operation proceeds from step 216 to step

222. In step 222, the telephone is operated to check if the user has selected battery landline or battery cell mode. If the mode selection module 222 has not received a user mode selection input 212, then operation proceeds to step 220, where the telephone is operated in landline powered mode, e.g., the default mode of operation when a landline is present. Other embodiments of the invention, may have different defaults in the event of a present landline, sufficient battery energy, and no user selection, e.g., default to landline battery powered mode.

If in step 222, the user has selected a battery landline or a battery cell mode of operation, then operation proceeds from step 222 to step 224. In step 224, the telephone 100 is operated to direct operations based on which mode was selected, the landline battery mode or the cell phone battery mode. If battery landline operation mode was selected, operation proceeds via connecting node B 226 to step 227; however, if battery cell phone operation mode was selected, then operation proceeds via connecting node A 228 to step 229.

Returning to step 214, if it was detected that the landline was not present, then operation proceeds to step 218. In step 218, the telephone 100 is operated to check if there is sufficient power in battery 126 to support cell phone mode. If the telephone 100 detects that there is insufficient energy to support cell phone mode, then in step 230 the telephone 100 is operated to display a message indicating insufficient power to support cell phone mode. For example, the mode selection module 122 may receive a low battery indication from the battery monitor 124 and send a signal to the battery powered telephone module 116 initiating a warning message to be forwarded and displayed on display 108. However, if in step 218 it is determined that there is sufficient power to support cell phone mode, then operation proceeds via connecting node A 228 to step 229.

Assuming operation proceeds to step 227, then the telephone 100 is configured for battery powered landline mode, if not already in that mode of operation. For example, the mode selection module 122 may control: the battery powered telephone module to be active for landline communications and advanced landline operations, e.g., caller ID, the POTS module to be deactivated, the mode control switch 107 to couple the battery powered telephone module 116 to the keypad 102, speaker 104, and microphone 106, and the mode control switch 107 to decouple the POTS telephone module 114 from the keypad 102, speaker 104, and microphone 106. In some embodiments, the battery powered landline mode of operation uses both the POTS telephone module 114 in conjunction with the battery powered telephone module 116, e.g., the POTS module handling ordinary communications and the battery powered telephone module handling advanced functions, e.g., caller ID and display 108 activity. Operation proceeds from step 227 to step 232. In step 232, the telephone 100 is operated to check, e.g., periodically, if there is sufficient power to support battery powered landline mode. If it is detected and determined in step 232, that there is insufficient power to continue in battery powered mode, then operation proceeds to step 234, otherwise operation proceeds to step 240. In step 234, the telephone 100 is operated to transition to fully landline powered mode. For example, the mode selection module 122 activates POTS module 114, deactivates battery powered telephone module 116 and control mode control switch 107 to decouple module 116 from keypad 102, speaker 104, and microphone 106 while coupling module 114 to keypad 102, speaker 104, and microphone 106. The transition of step 234 is performed, in accordance with the invention, without interrupting the call in progress. Operation proceeds from step 234 to step 236, where operation continues in landline powered mode until the call in progress is completed. Then operation proceeds to connecting node C 238.

Returning to step 232, if there was sufficient power to support continued operation in battery landline mode, then operation proceeds to step 240 where the operation, e.g., including processing related to the call in progress, continues in battery powered landline mode. From step 240 operation proceeds to step 241, where a check is performed as to whether the call is completed. If it is determined in step 241 that the call has completed, e.g., the call has been terminated by one of the parties participating in the call, operation proceeds to connecting node C 238; otherwise, operation returns to step 232, where the remaining battery power is again checked, e.g., after some predetermined delay, for sufficiency to continue in the battery landline mode.

Assuming operation proceeds to step 229, then the telephone 100 is configured for battery cellular communications mode, if not already in that mode of operation. For example, the mode selection module 122 may control: the battery powered telephone module to be active for cell phone operations, e.g., controlling the wireless interface 112 and transmitter/receiver module 110 to be functional, the POTS module 114 to be deactivated, the mode control switch 107 to couple the battery powered telephone module 116 to the keypad 102, speaker 104, and microphone 106, and the mode control switch 107 to decouple the POTS telephone module 114 from the keypad 102, speaker 104, and microphone 106. Operation proceeds from step 229 to step 242. In step 242, the telephone 100 is operated to check, e.g., periodically, if there is sufficient power to support battery cell mode. If it is detected and determined in step 242, that there is insufficient power to continue in battery powered cell mode, then operation proceeds to step 244, otherwise operation proceeds to step 246. In step 244, the telephone 100 is operated to terminate the cell call due to a lack of battery power. Operation proceeds from step 244 to connecting node C 238.

Returning to step 242, if there was sufficient power to support continued operation in battery cell mode, then operation proceeds to step 246 where the operation, e.g., including processing related to the call in progress including operation of the transmitter/receiver 110 and wireless interface 112, continues in battery powered cell mode. From step 246 operation proceeds to step 247, where a check is performed as to whether the call is completed. If it is determined in step 247 that the call has completed, e.g., the call has been terminated by on of the parties participating in the call, operation proceeds to connecting node C 238; otherwise, operation returns to step 242, where the remaining battery power is again checked, e.g., after some predetermined delay, to determine sufficiency to continue in the battery cell mode.

From connecting node C 238 operation proceeds to step 204, where additional monitoring is performed for call related signals, e.g., user input to initiate a new call or a signal corresponding to another incoming call.

In some embodiments, received input used to select the mode of operation, e.g., landline in 208, battery level 210, and/or user mode 212 may be processed distinctly, e.g., independently, from and/or at different times with respect to the processing of the call related signals being monitored in step 204. In some embodiments, the telephone 100 remains in a user selected mode until commanded into another user selected mode or forced to another user selected mode, e.g., by a change in battery level or a disconnection or the landline telephone line.

In some embodiments, some enhanced features, e.g., speed dial, call waiting, and/or call forwarding message retrieval, etc., may be available in the POTS line powered mode, without requiring any battery power.

In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

What is claimed is:

1. A telephone comprising:
   a telephone line jack for receiving a telephone line;
   a battery;
   a microphone;
   a speaker;
   a battery powered telephone module coupled to said microphone and said speaker for performing cell phone call operations during a cell phone mode of operation;
   a landline telephone module coupled to said microphone and said speaker, said telephone being powered during a landline powered mode of operation solely from a telephone line to which said landline telephone module is coupled; and
   a mode selection module for selecting as a function of a signal indicating whether a telephone line is inserted into said telephone line jack, between at least a telephone line powered mode of operation and a battery powered mode of operation.

2. The telephone of claim 1, further comprising:
   a battery monitor coupled to said battery and to said mode selection module, said battery monitor providing battery condition information to said mode selection module.

3. The telephone of claim 1, wherein said mode selection module is responsive to said battery condition information and operates to restrict telephone device operation to a landline powered mode of operation when there is insufficient battery power to support a battery powered mode of telephone operation.

4. The telephone of claim 3, further comprising a keypad coupled to said mode selection module, said keypad providing user mode of operation selection information to said mode selection module.

5. The telephone of claim 4, wherein said mode selection module allows a user to select between a landline powered mode of operation and a battery powered mode of operation when a telephone line is inserted into said telephone jack and there is sufficient power to support a battery powered mode of telephone device operation.

6. The telephone of claim 4, further including:
   a display device for displaying call related information including calling party identification information when operating in at least one mode of battery powered operation, the display device being coupled to said battery powered telephone module.

7. The telephone of claim 6, wherein said mode selection module selects said telephone line powered mode of operation as the default mode of operation when a telephone line is inserted into said telephone jack.

8. The telephone of claim 6, further comprising a transmitter/receiver coupled to said battery powered telephone module for transmitting and receiving cellular communications signals when operating in a battery powered mode of operation which supports cellular communication.

9. A method of operating a telephone capable of supporting a plurality of different modes of telephone operation including a landline powered mode of operation in which said telephone is powered solely by said landline and at least one battery powered mode of operation in which at least some telephone operations are powered by battery power and said telephone is capable of receiving and sending signals over a cellular communications link, the method comprising:
   receiving battery status information;
   generating a signal indicating if a telephone line is connected to said telephone; and
   selecting between at least said landline powered mode of operation and said battery powered mode of operation as a function of said received battery status information and whether said generated signal indicates that a landline telephone line is connected to said telephone.

10. The method of claim 9 wherein said selecting includes selecting said landline powered mode of operation as a default mode of operation when said generated signal indicates that a landline is connected to said telephone.

11. The method of claim 9, wherein said battery powered mode of operation is a cell phone mode of operation.

12. A method of operating a telephone capable of supporting a plurality of different modes of telephone operation including a landline powered mode of operation in which said telephone is powered by said landline and at least one battery powered mode of operation in which at least some telephone operations are powered by battery power and said telephone is capable of receiving and sending signals over a cellular communications link, the method comprising:
   generating a signal indicating if a telephone line is connected to said telephone; and
   selecting between at least said landline powered mode of operation and said battery powered mode of operation as a function of whether said generated signal indicates that a telephone line is connected to said telephone, including receiving battery status information; and
   selecting said mode of operation as a function of said received battery status information and said signal indicating whether a landline is connected to said telephone, said method further comprising:
   operating said telephone to transition from a battery powered mode of operation involving communication over said landline to said landline powered mode of operation during an ongoing telephone call in response to received battery status information indicating a change in battery status.

13. The method of claim 12, wherein said telephone switches to said landline powered mode of operation in response to said receive battery status information indicating that the battery has insufficient power to continue to support said battery powered mode of operation involving communication over said landline.

14. A method of controlling a telephone to operate in different modes of operation, the method comprising:

operating said telephone in a solely landline powered mode of operation during a first period of time when said telephone is coupled to a landline;

operating said telephone in a battery powered cell phone mode of operation during a second period of time during which said telephone is not coupled to said landline; and operating said telephone to switch between a battery powered mode of landline operation and said solely landline powered mode of operation in response to a detected decrease in battery power.

15. The method of claim 14, further comprising:

supporting caller identification functionality in said battery powered landline mode of operation but not in said solely landline powered mode of operation.

16. The method of claim 14 further comprising:

operating said telephone in a battery powered mode of landline operation in which caller identification functionality is supported during a third period of time during which said telephone is coupled to said landline.

\* \* \* \* \*